United States Patent [19]

Carl

[11] Patent Number: 4,748,190
[45] Date of Patent: May 31, 1988

[54] PROCESS FOR FORMING A SHAPED POROUS FLUORINATED POLYMER CATALYST AND THE RESULTANT PRODUCT

[75] Inventor: William P. Carl, Angleton, Tex.
[73] Assignee: The Dow Chemical Company, Midland, Mich.
[21] Appl. No.: 813,130
[22] Filed: Dec. 24, 1985
[51] Int. Cl.$^4$ ............... C08J 9/06; C08J 9/12; B29C 67/22
[52] U.S. Cl. ............... 521/38; 264/53; 264/54; 264/DIG. 5; 502/159; 521/89; 521/95; 521/96; 521/97; 521/145
[58] Field of Search ............... 264/51, 54, DIG. 5; 521/38, 89, 95, 96, 97, 145; 502/159

[56] References Cited

U.S. PATENT DOCUMENTS

| | | | |
|---|---|---|---|
| 2,988,441 | 6/1961 | Pruitt | 71/27 |
| 3,024,207 | 3/1962 | Shaw et al. | |
| 3,219,656 | 11/1965 | Boettner | |
| 3,460,965 | 8/1969 | Anderson et al. | 117/47 |
| 3,464,798 | 9/1969 | Kilthau | 23/253 |
| 3,586,646 | 6/1971 | Corte et al. | |
| 3,621,059 | 11/1971 | Bartlett | |
| 3,692,569 | 9/1972 | Grot | 117/138.8 UF |
| 3,692,710 | 9/1972 | Lorcher et al. | |
| 3,867,319 | 2/1975 | Lundberg | |
| 3,947,387 | 3/1976 | Lundberg | |
| 4,039,483 | 8/1977 | Honda et al. | |
| 4,056,112 | 11/1977 | Calmon | 134/6 |
| 4,267,364 | 5/1981 | Grot et al. | 521/38 X |
| 4,353,853 | 10/1982 | Swift | 264/41 |
| 4,368,277 | 1/1983 | Burinsky et al. | 521/84 |
| 4,379,858 | 4/1983 | Suzuki | 521/54 |
| 4,434,116 | 8/1984 | Covitch | 264/49 |
| 4,683,216 | 7/1987 | Farcasiv | 502/159 |
| 4,687,755 | 8/1987 | Green | 502/159 |

FOREIGN PATENT DOCUMENTS

| | | |
|---|---|---|
| 0070635 | 1/1983 | European Pat. Off. |
| 1497748 | 1/1978 | United Kingdom |

OTHER PUBLICATIONS

Research Disclosure 22108 (dated Sep. 1982, p. 311).
Chemical Abstracts 49375t (vol. 74, 1971, p. 533).
Chemical Abstracts 97:183006b (vol. 97, 1982, p. 11).

*Primary Examiner*—Philip Anderson

[57] ABSTRACT

The invention is a process for making a high surface area, self-supporting catalyst suitable for use as an acid catalyst comprising:

(a) at least partially polymerizing a perfluorinated monomer containing ion exchange groups convertible to an acid or salt form in a medium containing a gas-forming ingredient(s) which is present during polymerization and serves a polymerization enhancement purpose during polymerization; wherein the said gas-forming ingredient(s) is a material that will convert into a gaseous state and expand when heated; and (b) heating the polymer to a temperature sufficient to soften the polymer and sufficient to convert at least a portion of the gas-forming ingredient(s) into a gaseous state while the polymer is still in contact with at least a portion of the gas-forming ingredient(s), thereby converting the gas-forming ingredient(s) into a gas which expands the polymer and causes the formation of open and closed pores within the polymer.

22 Claims, No Drawings

PROCESS FOR FORMING A SHAPED POROUS FLUORINATED POLYMER CATALYST AND THE RESULTANT PRODUCT

BACKGROUND OF THE INVENTION

It is economically desirable for catalysts to be used in thin layers to provide the maximum amount of catalyst surface area per unit of catalyst mass. However, not all catalysts are self-supporting when in thin layers and must be coated onto a catalyst support material. Commonly used catalyst support materials include such things as silicious materials or metal oxide materials.

Although catalyst support materials provide rigid, porous supports for catalysts, there are some disadvantages in using such materials. First, the support materials must be selected to be chemically and thermally stable in the atmosphere, and under the conditions, in which it will be used. Sometimes, it is not easy to find a suitable support to match the chemical and thermal requirements. Secondly, silicious and metal support materials are somewhat brittle and, when such support materials are used, more-than-usual care must be exercised in building a bed of coated catalyst particles to minimize breakage and to minimize the amount of catalyst material broken off from the support material. Thirdly, the process used for coating catalysts onto support materials is frequently a difficult process and requires expensive capital equipment. Lastly, not all catalysts are easily formed into thin films, thus, such catalysts cannot be coated onto substrates.

The present invention provides a novel and unobvious process for making a high surface area, self-supporting catalyst. It can be used to produce a catalyst in a variety of physical forms; including granules, sheets, strands, or almost any other desired shape. The process does not coat a catalyst onto a support material, and, thus, avoids the heretofore mentioned problems with the use of catalyst supports.

SUMMARY OF THE INVENTION

The invention is a process for making a high surface area, self-supporting catalyst suitable for use as an acid catalyst comprising:

(a) at least partially polymerizing a perfluorinated monomer containing ion exchange groups convertible to an acid or salt form in a medium containing a gas-forming ingredient(s) which is present during polymerization and serves a polymerization enhancement purpose during polymerization; wherein the said gas-forming ingredient(s) is a material that will convert into a gaseous state and expand when heated; and (b) heating the polymer to a temperature sufficient to soften the polymer and sufficient to convert at least a portion of the gas-forming ingredient(s) into a gaseous state while the polymer is still in contact with at least a portion of the gas-forming ingredient(s), thereby converting the gas-forming ingredient(s) into a gas which expands the polymer and causes the formation of open and closed pores within the polymer.

DETAILED DESCRIPTION OF THE INVENTION

The present invention can be used in conjunction with a variety of polymerization methods including emulsion polymerization, bulk polymerization and solution polymerization.

Emulsion polymerization is an addition polymerization process in which numerous concurrent propagating centers are simultaneously active while separated from one another in the reactor medium. The majority of emulsion polymerizations are carried out in aqueous systems, but other mediums have been used. Emulsion polymerization mediums usually contain the following components: (1) the monomer(s) to be polymerized, (2) the medium (commonly water), (3) a micelle generator, a surfactant or a soap, and (4) an initiator or initiator system. The reaction medium, itself, is the phase which serves to disperse and separate the polymerization sites created by the micelle generator. The micelle generator serves to solubilize or disperse the monomers and hold them in the polymerization loci. The initiator, or initiator system, serves to induce the addition of the monomer molecules to one another by introducing charge sites or free radicals at the addition point. Buffers, other pH control substances, and/or other flocculating agents, etc. may also be present.

Solution polymerization is a type of polymerization carried out in the presence of a solvent. The solvent is a solvent for the monomer and, optionally, may also be a solvent for the polymer to be produced from the polymerization. Optionally, the solvent may not be a solvent for the polymer and, thus, the polymer precipitates as it is formed. Solution polymerization allows the polymerization reaction to be carried out without having the reaction system become excessively viscous. In addition, solution polymerization allows the maximum amount of heat to be removed, or dissipated, from the system during the polymerization reaction. Solution polymerization mediums usually contain the following components: (1) monomers to be polymerized; (2) initiators [which are any of several types of compounds which introduce either free radicals or ions; (3) a solvent (present in sufficient quantity to keep the monomers and/or polymer in solution as desired to keep the viscosity suitably low and to serve as a heat sink).

Perfluorinated monomers suitable for use in the present invention include non-ionic monomers described in the following patents: U.S. Pat. Nos. 3,282,875; 3,909,378; 4,024,405; 4,065,366; 4,116,888; 4,123,336; 4,126,588; 4,151,052; 4,176,215; 4,178,218; 4,192,725; 4,209,635; 4,212,713; 4,251,333; 4,270,779; 4,329,435; 4,330,654; 4,337,137; 4,337,211; 4,340,680; 4,357,218; 4,358,412; 4,358,545; 4,417,969; 4,462,877; 4,470,889; 4,478,685; and European Patent Application No. 0,027,009. Such monomers are typically polymerized to form fluoropolymers having equivalent weights of from about 500 to about 2000.

Particularly preferred are monomers selected from two groups of monomers. Optionally a third type of monomer may be used.

A monomer containing ion exchange groups convertible to an acid or salt form is represented by the general formula:

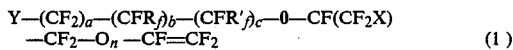

$$Y-(CF_2)_a-(CFR_f)_b-(CFR'_f)_c-O-CF(CF_2X)-CF_2-O_n-CF=CF_2 \qquad (1)$$

where:
Y is selected from the group consisting of $-SO_2Z$, $-CN$, $-COZ$, $-COOCH_3$ and $-C(R^3_f)(R^4_f)OH$;
Z is selected from the group consisting of $-I$, $-Br$, $-Cl$, $-F$, $-OR$, and $-NR_1R_2$;
R is a branched or linear alkyl radical having from 1 to about 10 carbon atoms or an aryl radical;

$R_f$ and $R'_f$ are independently selected from the group consisting of —F, —Cl, perfluoroalkyl radicals having from 1 to about 10 carbon atoms and fluorochloroalkyl radicals having from 1 to about 10 carbon atoms;

$R_1$ and $R_2$ are independently selected from the group consisting of —H, a branched or linear alkyl radical having from 1 to about 10 carbon atoms, and aryl radicals;

$R^3{}_f$ and $R^4{}_f$ are independently selected from the group consisting of perfluoroalkyl radicals having from 1 to about 10 carbon atoms;

X is —Cl, —Br, —F, or mixtures thereof when n>1;

a is 0–6;

b is 0–6; and c is 0 or 1;

provided a+b+c is not equal to 0.

Particularly preferred is when Y is —SO$_2$F or —COOCH$_3$; n is 0 or 1; $R_f$ and $R'_f$ are —F; X is —Cl or —F; and a+b+c is 2 or 3.

Optionally, the monomer may include a second type of monomer represented by the general formula:

$$CF_2=CZZ' \qquad (2)$$

where Z and Z' are independently selected from the group consisting of —H, —Cl, —F, and —CF$_3$.

The monomer may optionally include a third represented by the general formula:

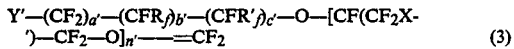

$$Y'—(CF_2)_{a'}—(CFR_f)_{b'}—(CFR'_f)_{c'}—O—[CF(CF_2X'\text{'})—CF_2—O]_{n'}—{=}CF_2 \qquad (3)$$

where:

Y' is —F, —Cl, or —Br;

n' is 0—6;

$R_f$ and $R'_f$ are independently selected from the group consisting of —Br, —Cl, —F, perfluoroalkyl radicals having from 1 to about 10 carbon atoms, and chloroperfluoroalkyl radicals having from 1 to about 10 carbon atoms; and X' is selected from the group consisting of —F, —Cl, —Br, and mixtures thereof when n'>1;

a' and b' are independently 0–3; and c' is 0 or 1;

provided a'+b'+c' is not equal to 0.

The gas-forming ingredient(s) is a component which is present in the polymerization mixture and serves a polymerization enhancement purpose during the polymerization of the fluoropolymer. It may include such things as initiators, surfactants and water. It is necessary, however, that the gas-forming ingredient be a material that will convert into a gaseous state and expand when heated to the polymerization temperature, provided the polymerization temperature is a temperature greater than the temperatures attained during prior operations during.

Initiators are present during polymerization because they serve to form radicals which react with the monomer molecules and cause them to add to one another or react with a growing polymer chain to terminate the chain. Materials that are commonly used for initiators during the polymerization of fluoropolymers and which are suitable for use in the present invention because they form a gas when heated to a temperature greater than the polymerization temperatures, include such materials as potassium persulfate, potassium bisulfite, ammonium persulfate, sodium persulfate, sodium bisulfite, organic fluorocarbon peroxides, azo compounds such as difluorodiazide, azo-bisisobutyronitrile and the like. Such compounds are well known in the art. Upon heating, initiators can decompose to form various gases. The persulfates, chlorates and peroxides decompose to form oxygen. The volatile organic peroxide substituents and the azo or azides can give off nitrogen and their organic moiety. Ziegler type initiators decompose to produce their various alkyl substituents.

Surfactants are present, during polymerization because they aid in dispersing the monomers in the polymerization medium and hold them at the polymerization site. Materials that are commonly used for surfactants during the polymerization of fluoropolymers and which are suitable for use in the present invention because they form a gas when heated, include such materials as longer chain alkyl sulfates, fluorinated alkyl carboxylates, fatty acid salts, and the like. Upon heating, surfactants decompose to form volatile substances, such as carbon dioxide gas and other volatile compounds. For example, surfactants containing carboxylic acid and salts of carboxylic acid are well known to decompose to carbon dioxide and other compounds such as unsaturated aliphatic substances at temperatures as low as 100° C. A wide range of substances can be selected from hydrocarbon surfactants to perfluorinated surfactants, depending on the polymerizing substances.

Water may also be present during polymerization of fluoropolymers because it serves as a dispersing medium as well as a means to carry heat away from the polymerization sites. Water is therefore suitable for use as the gas-forming material in the present invention because it forms a gas (steam) when heated to temperatures above 212° Fahrenheit at atmospheric pressure.

To form polymers into foamed polymer structures having open and closed pores, according to the present invention, it is necessary to heat the polymer to a temperature sufficient to soften the polymer and sufficient to convert at least a portion of the gas-forming ingredient(s) into a gaseous state while the polymer is still in contact with at least a portion of the gas-forming ingredient(s). The conversion of the gas-forming ingredient(s) into a gaseous state while it is intimately mixed with the softened fluoropolymer causes the fluoropolymer to foam, thereby creating fluoropolymers having a large number of open and closed pores.

The fluoropolymer may be heated in a variety of ways including heating in an oven, an enclosed vessel, an extrusion device, or a drying apparatus. Such devices can restrain the vapor formation by holding the polymer at its softening point until the vapor formation temperature is achieved in an enclosed place, then the polymer and vapor forming agents can be released into an area of lower pressure, thus causing the expansion of the vapor forming agents, and thereby forming a foamed polymer structure with open and closed cells.

It is particularly convenient to foam the fluoropolymer during the formation of the polymer into a shape, for example by extrusion, because the fluoropolymer must be heated to its softening point during extrusion. This minimizes the number of times that the fluoropolymer must be heated and allows the foaming of the fluoropolymer and the formation of the fluoropolymer into the desired shape to be conducted simultaneously.

Extrusion is the process by which the fluoropolymer is formed into into the desired shape. It is a process whereby the fluoropolymer is heated to its softening point and transported by a tapered screw auger through a barrel, which may be heated. The polymer is compacted to a fluidized state and forced through limiting orifices, dies, spinnarets for forming into the desired rods, strands, sheets, pellets or the like.

Extruders come in various types including a MPM (Modern Plastics Machinery, Inc. of New Jersey) 1" laboratory model extruder, Killion Extrudes plastics extruder, Haake Co. Rheomex extruder and others commonly employed in the extrusion of thermoplastics and preforming of thermosets. Each of the types of extruders named above utilize a tapered screw rotating in such a way that it gradually compresses the substance being extruded toward a forming area within the barrel enclosure with heating if so desired.

The extruders preferably used in the present invention is a 1" MPM laboratory extruder with a 25:1 L/D plastics screw with an Xaloy 400 barrel. The die is preferably made from Hastelloy C and operated using a 20 mil × 8" wide gap. The barrel temperatures may vary depending on the desired result. Likewise, the die temperatures may also vary depending upon the desired result. This configuration is preferred because of the ease of the temperature control at the various points in the equipment as well as the precise control of the screw rotation and torque.

During extrusion of fluoropolymers, the polymer is preferably introduced into the feed port of the extruder at ambient conditions such that no gross formation of volatiles occurs. The screw transports the polymer down along the barrel length and during the passage down the barrel the polymer is heated gradually to the softening point and masticated with mixing. As the temperature is further increased, the polymer is mixed and compressed into a homogeneous mass and is extruded through the die. As the polymer sheet is allowed to pass out of the die.

It is desirable to vary the amount of the gas-forming ingredient to a level where, when it is converted into a gas, it produces a volume of gas suitable to foam the polymer to the desired degree.

The foamed material produced by the above-described method is suitable for use as a catalyst for a variety of organic reactions. Examples of such reactions include nitrations, alkylations, ketal, Diels-Alder, esterifications, hydrations, and rearrangements.

The improved form of catalyst has a lower bulk density and thus has enhanced surface area and greater porosity for a given weight and functionality. The present material is self-supporting and requires no additional physical support or substrate.

EXAMPLE

A copolymer of $CF_2=CF_2$ and $CF_2=CFOCF_2SO_2F$ having an equivalent weight of about 850 was prepared according to the following procedure. About 784 grams of $CF_2=CFOCF_2CF_2SO_2F$ was added to about 4700 grams of deoxygenated water containing about 25 grams of $NH_4CO_2$ $C_7F_{15}$; about 18.9 grams of $Na_2HPO_4\cdot7H_2O$; about 15.6 grams of $NaH_2PO_4\cdot H_2O$ and about 4 grams of $(NH_4)_2S_2O_8$ under a positive pressure of about 195 pounds per square inch gauge (psig) of tetrafluoroethylene at about 60° Celsius for about 88 minutes. The reactor was vented under heat and vacuum to remove residual monomers. The reactor contents were then frozen, thawed, filtered and washed to remove gross amounts of the salts and soap.

The polymer mixture was then dried in a vacuum oven for 16 hours at 110° C. then extruded through a 1" MPM extruder equipped with a 8" sheet die and 25:1 L/D screw and Xaloy 400 barrel at a temperature of about 260° Celsius (about 500° Fahrenheit) through an opening approximately 20 mils thick and about 8" wide. As the film was extruded, the residual surfactant, $CO_2$, water, and initiator formed a gas and caused the polymer mixture to foam. The polymer structure contained both open and closed cells.

The foamed polymers of the present invention may be in a variety of shapes and sizes including particles, sheets, strands, wound strands, rods, etc. They may be in the form of tubes, for use in tube-shaped reactors.

I claim:

1. A process for making a high surface area, self-supporting catalyst suitable for use as an acid catalyst comprising:
   (a) at least partially polymerizing a perfluorinated monomer containing ion exchange groups convertible to an acid or salt form in a medium containing a gas forming ingredient(s) which is present during polymerization and serves a polymerization enhancement purpose during polymerization wherein the said gas-forming ingredient(s) is a material that will convert into a gasous state and expand when heated; and
   (b) heating the polymer to a temperature sufficient to soften the polymer and sufficient to convert at least a portion of the gas-forming ingredient(s) into a gaseous state while the polymer is still in contact with at least a portion of the gas-forming ingredient(s), thereby converting the gas-forming ingredient(s) into a gas which expands the polymer and causes the formation of open and closed pores within the polymer;

wherein the gas-forming ingredient is selected from the group consisting of: potassium persulfate, potassium bisulfite, ammonium persulfate, sodium persulfate, sodium bisulfite, organic fluorocarbon peroxides, azodifluodiazide, azo-bisisobutyronitrilealkyl sulfates, fluorinated alkyl carboxylates, fatty acid salts, and water.

2. The process of claim 1 wherein the perfluorinated monomer is represented by the general formula:

$$Y-(CF_2)_a-(CFR_f)_b-(CFR'_f)_c$$
$$-O-[CF(CF_2X)-CF_2-O]_n-CF=CF_2 \quad (1)$$

where:

Y is selected from the group consisting of $-SO_2Z$, $-CN$, $-COZ$, $-COOCH_3$ and 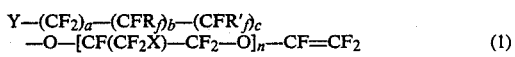 $-C(R^3{}_{hd\ f})(R^4{}_F)$ OH;

Z is selected from the group consisting of $-I$, $-Br$, $-Cl$, $-F$, $-OR$, and $-NR_{1R2}$;

R is a branched or linear alkyl radical having from 1 to about 10 carbon atoms or an aryl radical;

$R_f$ and $R'_f$ are independently selected from the group consisting of $-F$, $-Cl$, perfluoroalkyl radicals having from 1 to about 10 carbon atoms and fluorochloroalkyl having from 1 to about 10 carbon atoms;

$R_1$ and $R_2$ are independently selected from the group consisting of $-H$, a branched or linear alkyl radical having from 1 to about 10 carbon atoms, and aryl radicals;

$R^3{}_f$ and $R^4{}_f$ are independently selected from the group consisting of perfluoroalkyl radicals having from 1 to about 10 carbon atoms;

X is $-Cl$, $-Br$, $-F$, or mixtures thereof when $n>1$;

a is 0–6;

b is 0-6; and c is 0 or 1;

provided a+b+c is not equal to 0.

3. The method of claim 2 wherein a second type of monomer is present which is represented by the general formula:

$$CF_2=CZZ' \qquad (2)$$

where Z and Z' are independently selected from the group consisting of —H, —Cl, —F, and —CF$_3$.

4. The method of claim 3 wherein a third type of monomer is present which is represented by the general formula:

$$Y'-(CF_2)_{a'}(CFR_f)_{b'}-(CFR'_f)_{c'}-O-[CF(CF_2X')-CF_2-O]_{n'}-CF=CF_2 \qquad (3)$$

where:

Y' is —F, —Cl, or —Br;

n' is 0-6;

R$_f$ and R'$_f$ are independently selected from the group consisting of —Br, —Cl, —F, perfluoroalkyl radicals having from 1 to about 10 carbon atoms, and chloroperfluoroalkyl radicals having from 1 to about 10 carbon atoms; and X' is selected from the group consisting of —F, —Cl, —Br, and mixtures thereof when n'>1;

a' and b' are independently 0-3; and c' is 0 or 1;

provided a'+b'+c' is not equal to 0.

5. The method of claim 2 wherein Y is —SO$_2$F or —COOCH$_3$; n is 0 or 1; R$_f$ and R'$_f$ are —F; X is —Cl or —F; and a+b+c is 2 or 3.

6. The method of claim 1 wherein the gas-forming ingredient(s) is an initiator.

7. The method of claim 1 wherein the gas-forming ingredient(s) is a surfactant.

8. The method of claim 1 wherein the polymer is heated to a temperature of from 100° Fahrenheit to about 700° Fahrenheit.

9. The method of claim 1 wherein the polymer is heated during an extrusion process.

10. The method of claim 9 wherein the polymer is heated to a temperature of from 100° Fahrenheit to about 700° Fahrenheit.

11. The method of claim 1 wherein the polymer is formed into particles, sheets, strands, wound strands, or rods.

12. The method of claim 1 wherein the polymer is formed into a tube-shaped member.

13. The method of claim 1 wherein the gas-forming ingredient is a solvent for the monomer.

14. The method of claim 13 wherein the solvent is also a solvent for the polymer.

15. The method of claim 1 wherein the gas-forming ingredient is a solvent for the polymer but not for the monomer.

16. The product produced by the method of claim 3.

17. The product produced by the method of claim 4.

18. The product produced by the method of claim 5.

19. The product produced by the method of claim 7.

20. The product produced by the method of claim 1.

21. The product produced by the method of claim 1.

22. The product produced by the method of claim 11.

* * * * *

UNITED STATES PATENT AND TRADEMARK OFFICE
CERTIFICATE OF CORRECTION

PATENT NO. : 4,748,190

DATED : May 31, 1988

INVENTOR(S) : William P. Carl

It is certified that error appears in the above-identified patent and that said Letters Patent is hereby corrected as shown below:

Col. 2, lines 59-60; change the formula to read as:
-- $Y-(CF_2)_a-(CFR_f)_b-(CFR'_f)_c-O-[CF(CF_2X)-CF_2-O]_n-CF=CF_2$ --.

Col. 3, lines 31-32; change the formula to read as:
-- $Y'-(CF_2)_{a'}-(CFR_f)_{b'}-(CFR'_f)_{c'}-O-[CF(CF_2X')-CF_2-O]_{n'}-CF=CF_2$ --.

Col. 3, line 56; delete "during".

Col. 4, line 9; delete the comma "," after "present".

Col. 4, line 66; delete 2nd occurrence of "into".

Col. 5, line 10; change "preforming" to --pre-forming--.

Col. 6, line 20, Claim 1; change "gas forming" to --gas-forming--.

Col. 6, line 22, Claim 1; insert a semi-colon ";" after "polymerization".

Col. 6, line 39, Claim 1; change "fluodiazide" to --fluorodiazide--.

UNITED STATES PATENT OFFICE
CERTIFICATE OF CORRECTION

PATENT NO. : 4,748,190

DATED : May 31, 1988

PAGE 2 OF 2

INVENTOR(S) : William P. Carl

It is certified that error appears in the above-identified patent and that said Letters Patent are hereby corrected as shown below:

Col. 6, line 49, Claim 2; change "$-C(R^{3hdf})(R^4_F)$" to -- $-C(R^3_f)(R^4_f)$ --.

Col. 6, line 58, Claim 2; insert --radicals-- after "chloroalkyl".

Signed and Sealed this

Twenty-eighth Day of February, 1989

Attest:

DONALD J. QUIGG

Attesting Officer

Commissioner of Patents and Trademarks